(12) United States Patent
Guerin et al.

(10) Patent No.: US 6,243,754 B1
(45) Date of Patent: Jun. 5, 2001

(54) DYNAMIC SELECTION OF NETWORK PROVIDERS

(75) Inventors: Roch A. Guerin, Yorktown Heights; Arvind Krishna, Somers; Vinod Gerard John Peris, Chappaqua; Dinesh Chandra Verma, Millwood, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/227,769

(22) Filed: Jan. 8, 1999

(51) Int. Cl.[7] ..................................... G06F 15/16
(52) U.S. Cl. .................. 709/227; 709/225; 709/228; 709/229; 709/238; 709/239
(58) Field of Search .................. 709/225, 227, 709/228, 229, 238, 239

(56) References Cited

U.S. PATENT DOCUMENTS

| | | | |
|---|---|---|---|
| 5,845,073 | * 12/1998 | Carlin et al. ........................ | 709/217 |
| 5,862,490 | * 1/1999 | Sasuta et al. ........................ | 455/525 |
| 5,933,490 | * 8/1999 | White et al. ........................ | 379/221 |
| 5,961,608 | * 10/1999 | Onosaka et al. .................... | 709/249 |
| 5,970,477 | * 10/1999 | Roden ................................ | 705/32 |
| 5,987,498 | * 11/1999 | Athing et al. ....................... | 709/203 |
| 5,991,292 | * 11/1999 | Focsaneanu et al. ............... | 370/352 |
| 6,112,245 | * 8/2000 | Araujo et al. ....................... | 709/228 |
| 6,119,162 | * 9/2000 | Li et al. .............................. | 709/227 |
| 6,128,668 | * 10/2000 | Barber et al. ....................... | 709/246 |
| 6,145,002 | * 11/2000 | Srinivasan .......................... | 709/225 |

* cited by examiner

*Primary Examiner*—Saleh Najjar
(74) *Attorney, Agent, or Firm*—Louis P. Herzberg

(57) ABSTRACT

A method, apparatus and system is provided by which two or more cooperating end-users of the Internet and/or other network can dynamically select and use a single Internet or other network service provider (ISP) from among a multitude of ISPs based on the application requirements. The service provider may be selected in a dynamic fashion. This overcomes the problem wherein traditionally most end-users, whether they are individuals or organizations, are connected to the Internet or other network through a single Internet and/or other network service provider. However, users generally may have more than a single connection to the Internet and/or other network. In such cases the routing of traffic over these multiple connections is handled by IP routers based on the routing information that they exchange with their peers. This information is relatively static in nature and is typically based on the state of links that interconnect the different routers. The invention provides a mechanism for the end-user to take advantage of different rates or services that might be provided by competing Internet and/or other network service providers. Furthermore, there are cases where the choice of which provider to use depends on the application. Thus this invention enables cooperating users (or sites of an organization) to dynamically select different providers on an application by application basis.

25 Claims, 4 Drawing Sheets

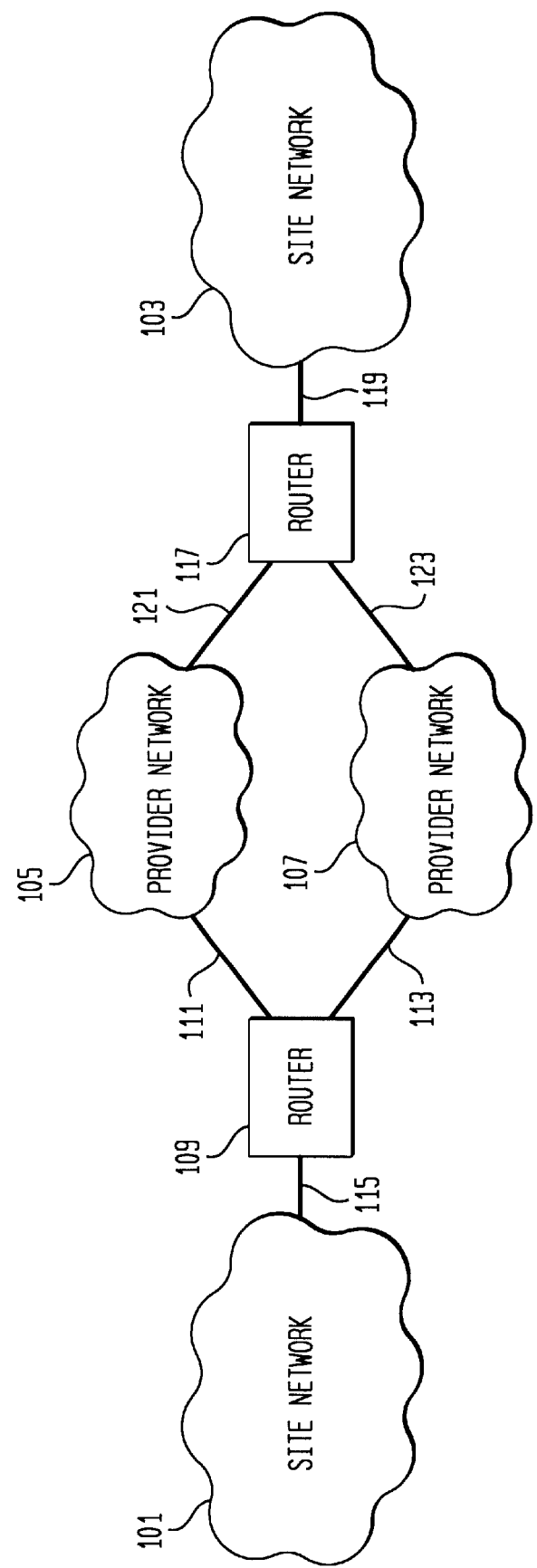

DYNAMIC SELECTION OF NETWORK PROVIDERS

FIELD OF THE INVENTION

This invention is directed to the field of computer networks. It is more particularly directed to networks wherein communication between two communicators may be accomplished using more than one network provider.

BACKGROUND OF THE INVENTION

Growth in the Internet and other network requirements have resulted in a proliferation of Internet Service Providers and other interconnection network providers. Both the Internet Service Providers and the other interconnection network providers are herein referred to as ISPS. Each ISP offers connectivity to the ubiquitous Internet and/or other network for multiple corporations as well as individual users. Due to the large number of network providers, as well as the anticipated number of new network providers, some sites are likely to have connectivity to the Internet and/or other network via more than one ISP. The level of service provided by the different service providers may indeed vary widely from one ISP to another.

As an example consider the case where two sites of an organization are connected to the Internet and/or other network through two different ISPs, namely ISP-A and ISP-B. It is quite conceivable that ISP-A guarantees a low delay but is rather expensive for its service, whereas ISP-B provides a cheaper service than ISP-A, but does not guarantee low delays. There may be some applications like voice that need low delay to be effective, whereas other applications like e-mail or file transfers are fairly tolerant to delays. In some cases the decision as to which ISP to use may further depend on the users individual preferences. With the current state of the art technology, the end-user is forced to choose a single ISP (in this case it is ISP-A or ISP-B) for routing traffic to any given destination. Even if the user is a multi-homed host with multiple connections to the Internet and/or other network the choice of which ISP to use is governed by the routing information exchanged by the routers in the Internet and/or other network. Typically the route chosen depends on the destination address in each packet and does not depend on the specific applications and their individual requirements.

If the user desires the low delay guarantee provided by ISP-A in the above example it is generally not sufficient to simply direct its traffic onto the interface that is connected to ISP-A. Each ISP is assigned ownership of a certain number of machine addresses in the Internet and/or other network, the range of these machine addresses being known as the address space of the ISP. If the destination address belongs to the address space of ISP-B, then it is quite likely that the packet will cross-over from provider ISP-A to ISP-B prematurely, thereby rendering the delay guarantee of ISP-A null and void. One solution is for all of the end-hosts to have IP addresses in the address-spaces of each candidate ISP so that this cross-over does not take place. However, this solution does not scale well as there may be quite a few ISPs and thousands of individual host machines. An alternate solution is to translate the addresses at the network edges so that depending on the applications individual requirements an appropriate ISP and an address from its space is chosen for each connection.

SUMMARY OF THE INVENTION

Accordingly, it is an aspect of the present invention to present a method, apparatus and system by which two or more cooperating end-users of the Internet and/or other network can dynamically select and use a single ISP from a multitude of ISPs based on the application requirements.

It is another aspect of the present invention to present an apparatus for selection of the Internet and/or other network service provider in a dynamic fashion.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 1 shows an example of a block diagram of a network in which an ISP Selection scheme outlined in this invention can be used;

DETAILED DESCRIPTION OF THE INVENTION

Figure 2A:
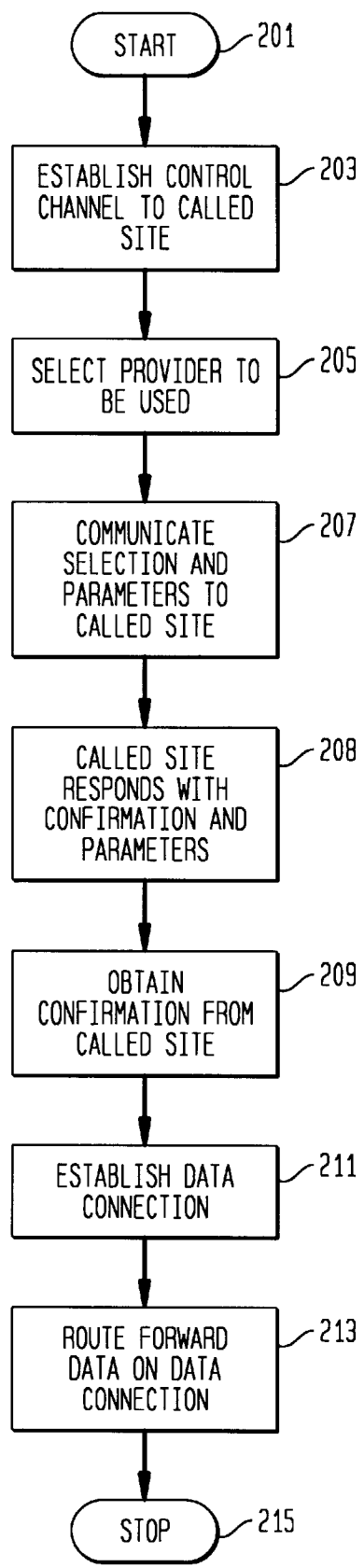
FIG. 2(a) is a flow diagram that illustrates an example of steps taken when ISP selection is made in accordance with the present invention.

FIG. 1 shows an example of a network block diagram within which a method of this invention can be used. The network of FIG. 1 includes a plurality of small networks at multiple sites which are connected together by means of a backbone network provided by an ISP. The figure shows networks at two sites, 101 and 103. These are connected together by means of two Internet (and/or other network) Service Provider networks, 105 and 107. The characteristics of ISP networks 105 and 107 are assumed to be quite different. For example, it is assumed that ISP network 105 provides an expensive but low-delay service between sites 101 and 103, while ISP network 107 provides a cheaper but higher-delay service between the same sites. Internet addresses at site 101 or 103 may be allocated from the address space of network 105 or from the address space of network 107. The operator of networks 101 and 103 may also choose to allocate addresses from another address-space that they may have been allocated independent of networks 105 or 107.

The network at: site 101 is connected to the ISP network 105 and 107 by means of a router 109. The router 109 is shown to have three interfaces. One interface 111 connects it to the ISP network 105. Another interface 113 connects it to the ISP network 107. A third interface 115 connects it to the local site network 101. Interface 111 has an address allocated in the address space of network 105, while interface 113 has an address allocated in the address space of network 107. Interface 115 may have an address in the address-space of network 105 or network 107, or in an independent address-space. Similarly, network 103 is connected to ISP networks 105 and 107 by means of a second router 117 with three interfaces 119, 121 and 123. Interface 121 has an address in the address space of network 105 and connects the router 117 to network 105. Interface 123 has an address in the address space of network 107 and connects the router 119 to the network 107. Interface 119 connects the router 117 to the network 103 and may have an address in the address-space of network 105, network 107, or may have an address from an independent address space.

In the network shown in FIG. 1, router 109 and/or 117 need to select a specific provider from a number of providers to exchange a specific set of application data. In order to use a specific provider, the router at the originating site takes the steps shown in FIG. 2(a). The process is entered in step 201 when the router has to determine the appropriate service provider to use for communication of application data to a remote called site. In step 203, the router at the originating site establishes a control channel to the router at the called site. After the establishment of the control channel, the two sites may exchange some control information such as the list of valid service providers at each site, and any performance or cost characteristics associated with the list of valid service providers. In step 205, the originating site selects an appropriate service provider from the different possible choices. A variety of criteria such as cost, quality of service, preestablished business contracts etc. may be used for selecting the service provider. In step 207, the originating site communicates its selection of the service provider to the called site. Along with the choice of the provider, parameters such as a specific address in the domain of the selected provider, which would be used for data exchange, may be communicated to the called site.

In some embodiments optional steps 208 and 209 are implemented. In step 208 the called site responds with a confirmation and possibly some configuration parameters. The originating site waits for the receipt of this confirmation in step 209. The originating site then establishes its local data connection state in step 211. The local data connection contains information that can be used to route forward data to the called site. In step 213, the router at the originating site starts forwarding packets to the called site using the information in the local data connection state. The procedure terminates in step 215.

Figure 2B:
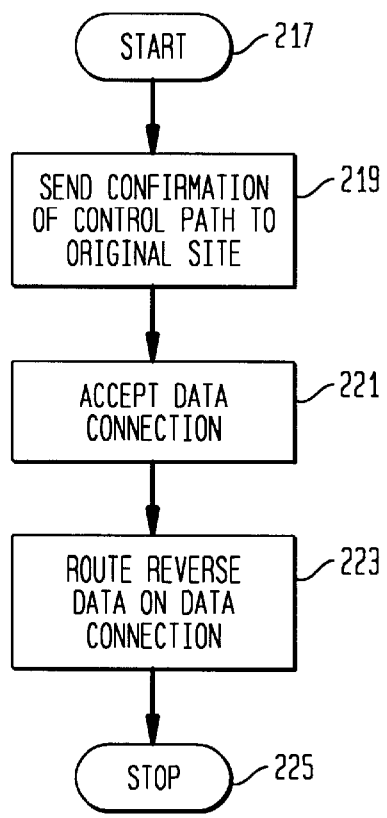
FIG. 2(b) shows a set of steps corresponding to FIG. 2(a) that are executed by the router at the called site in accordance with the present invention.

FIG. 2(b) shows a corresponding set of steps that are executed by the router at the called site. The router at the called site enters the process in step 217 until it receives a request for a control connection from an originating site. In step 219, the router accepts the control connection, and exchanges any control parameters with the originating site. In step 221, the router at the called site accepts a data connection and creates the local connection state for receiving data from the originating site.

In one embodiment, the acceptance of the data connection in step 221 is a separate request from the originating site. In an alternate embodiment, acceptance is implied by the creation of the control connection. In step 223, the router at the called site starts to forward reverse direction data packets for the communication along the data connection established in step 221. The procedure terminates in step 225.

When the originating site has to communicate with a second called site, it repeats steps 203–215 using a second control channel and a second data connection. A second control channel may be created to two different routers at the same called site. In some cases, the second called site and the first called site may be served by the same router. In other cases, the second called site and the first called site may be the same site.

Variations to the steps outlined in FIG. 2 may be performed when multiple data connections are being established between two sites. For instance, the control channel need not always be created among two sites. The originating site can check to determine if a control channel already exists for the called site, and only creates a control channel if such a channel does not already exist.

Figure 3:
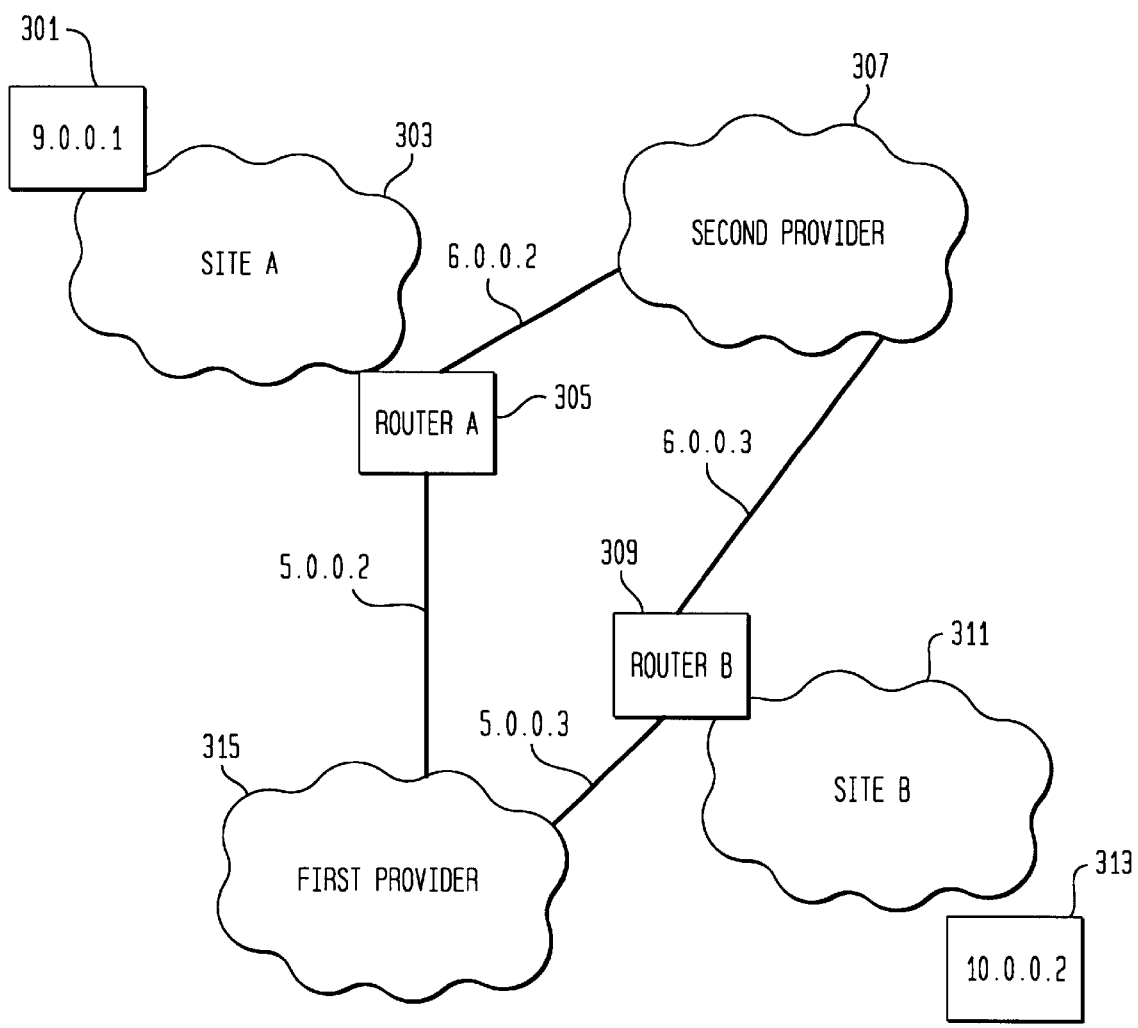
FIG. 3 is a block diagram illustrating an example of network ISP selection in accordance with the present invention.

Data forwarding is generally accomplished by encapsulating the original data packets into an outer packet or by network address translation. FIG. 3 shows a case where a first communicator 301 with an address of 9.0.0.1 at site A 303 wishes to communicate with a second communicator 313 with address of 10.0.0.2 at site B 311. Router-A 305 at site A 303 is connected to two Internet Service Providers 315 and 307. On the first provider 315, router-A 305 has an address of 5.0.0.2 and on Second Provider 307 router-A 305 has an address of 6.0.0.2. At site B 311, the address of router-B 309 interfacing with the First Provider is 5.0.0.3 and 6.0.0.3 on the Second Provider. Thus, the addresses of 5.0.0.2 and 5.0.0.3 belong to the first provider 315 and the address of 6.0.0.2 and 6.0.0.3 belong to the second provider 307.

Assume that router-A and router-B determine that they want to use the first provider for the communication using the control connection. In an embodiment using encapsulation, each packet which is addressed from 9.0.0.1 to 10.0.0.2 is encapsulated into a larger packet by router-A at site A. The creation of the data connection is implicit in this case. The source address of this packet consists of 5.0.0.2 and the destination address consists of 5.0.0.3. The packet is forwarded to router-B at site B. Router-B extracts the original packet from the larger packet, and forwards it to the eventual destination 10.0.0.2. A similar process is used for the reverse path of communication from 10.0.0.2 to 9.0.0.1.

In an embodiment employing network address translation, a slightly different process is generally used. In addition to the interface addresses, each router also obtains a block of IP addresses from each service provider. This block of address is referred to as the address space of the provider that can be used by the router. For instance, the first service provider assigns a block of addresses 5.0.0.10 through 5.0.0.20 for site A, and another block of addresses 5.0.0.30 through 5.0.0.40 for site B. The addresses of 5.0.0.10 through 5.0.0.30 are in the address space of the first provider. Another block of addresses 6.0.0.10 through 6.0.0.30 is obtained from the address space of the second provider.

In this case, a data connection is explicitly created for communication in step 211 of FIG. 2(a). The data connection establishment negotiates that address 5.0.0.10 be used at site A and address 5.0.0.30 be used at site B for communication between communicators 301 and 313, 9.0.0.1 and 10.0.0.2. Router-A at site A contains a mapping from source address 9.0.0.1 to 5.0.0.10, and a mapping from forward destination address 10.0.0.2 to 5.0.0.20. During data forwarding, router-A changes the source address of all packets from communicator 301 9.0.0.1 to communicator 313 10.0.0.2 to 5.0.0.10, and changes the destination address of the same packet to 5.0.0.20. Router-B at site B, on receiving the packet, restores the original source and destination addresses of the packet. An analogous translation is done for packets on the reverse data path. The mapping of addresses are communicated to the router at the called site via the control channel established between the routers at the two sites.

Figure 4:
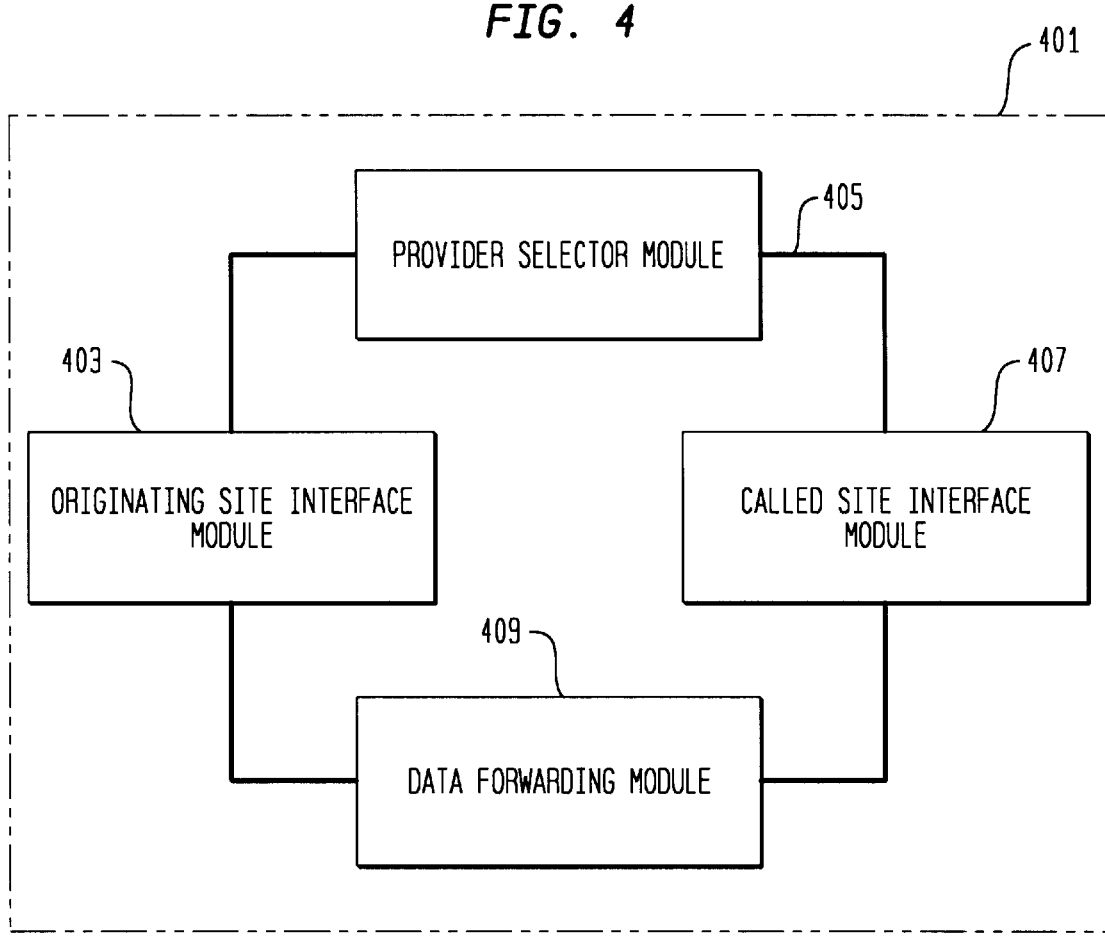
FIG. 4 is a block diagram that describes an example of a structure of an apparatus which can be used to implement an ISP selection scheme in accordance with the present invention.

FIG. 4 illustrates an example block diagram of a router that is capable of service provider selection. Such a router 401 includes an originating site interface module 403, a provider selector module 405, a called site interface module 407, and a data forwarding module 409. The originating site interface module 403 is responsible for establishing new control connections to other called sites. The called site interface module 407 is responsible for receiving connection requests from other sites. The service provider module 405 selects a specific service provider and is accessed by the called site interface module 407 and the originating site interface module 403 during their operation. The data forwarding module 409 is responsible for doing data encapsulation or address translation for the purpose of packet forwarding. This module operates on the basis of the configuration determined by module 407 and module 403.

In alternate embodiments the data forwarding module 409 includes a translator module or an encapsulator module. The translator module is used when network address translation is used. The encapsulator module is used when packet encapsulation is used for data forwarding. In some implementations, the data forwarding module may consist of a translator module as well as an encapsulator module, with different modules being used for different sets of data connections.

Thus an aspect of the present invention is to provide a method for an originating site to select a specific provider from a plurality of providers, for a set of application data for a called site. The method includes of the following steps:

1. An originating site establishes a control channel to a called site. Using the control channel, the two sites communicate setup parameters for the exchange of a set of application data.

2. The originating site selects a specific provider to handle this exchange of application data.

3. The originating site communicates the selection of the specific provider to the called site using the control channel.

4. The originating site establishes a connection to the called site using the selected specific provider.

5. The originating sites routes all forward application data on the established connection.

6. The called site routes all return application data transmission on the same connection.

In order to route the application data on a specific connection, one of the following two methods can be used:

(A) The originating site maps the destination address for all data packets for the specific application data into a previously selected specific destination address. One mapping of this nature is to encapsulate an original packet into a larger packet which is sent to a destination address at the called site. The destination address must belong to the address space of the selected service provider.

(B) The originating site negotiates the mapping to be used with the called site. A proposed mapping of the destination addresses for forward data communication and a reverse destination mapping for return application data is exchanged using the control channel. The reverse destination address and the forward destination address belong to the address space of the selected service provider.

When the originating site has to exchange application data with another called site, the steps outlined above are repeated. The originating site establishes a second control channel between the originating site and the second called site, selects another provider for exchange of the application data, communicates the selection of the provider via the control channel, makes another connection to the new called site, and routes all data in the forward path on this established connection, while the called site uses this same connection for the return data transmission.

In some embodiments of the method the first called site and the second called site are at a common location, and/or the first provider and the second provider are common.

Another aspect of the present invention is to provide a system enabling an originating site to select a specific provider from a plurality of providers, for exchanging at least one set of application data with a first called site. The system includes an originating site interface module to establish a control channel between the originating site and the called site for communicating setup parameters for a set of application data, a provider selector module to select the specific provider to handle all transmissions of the set of application data, an interface module to communicate with the called site on the control channel, such communication comprising a selection of the specific provider for a connection for transmitting the set of application data. The originating site router makes a connection to the called site using the specific provider, and routes all forward data of the set of application data to the called site via the connection. The called site router routes all return data transmissions of the set of application data to the originating site on the same connection.

In an embodiment the system also include a translator module which may be of one of the following two types:

(A) a translator that translate an arbitrary forward destination address for the connection into a specific destination address using a particular mapping, wherein the specific destination address belongs to an address space of the specific provider, (B) an original site translator that employs the interface module to negotiate a particular mapping with the called site via the control channel for a connection, and the called site translator that uses the particular mapping to map a reverse destination address for sending the return application data on the connection to the originating site, where the reverse and forward destination address are in the address space of specific provider.

When a second set of application data needs to be exchanged with a second called site, the called site interface module establishes a second control channel between the originating site and a second called site for communicating setup parameters for a second set of application data. The provider selector module selects a second provider to handle all transmissions of the second set of application data, communicates to the second called site via the second control channel the selection of the provider. The original site interface module establishes a second connection to the second called site, and the translator module routes all data of the second set of application on the second connection.

Still another aspect of the present invention is to provide an article of manufacture which includes a computer usable medium having computer readable program code means embodied therein for causing an originating site to select a specific provider from a plurality of providers, for exchanging at least one set of application data with a first called site. The computer readable program code means in the article of manufacture comprises computer readable program code means for causing a computer to execute the steps outlined in this invention, or to create and/or configure a system that embodies the invention described here.

Still another aspect of the present invention is to provide a program storage device readable by machine, tangibly embodying a program of instructions executable by the machine to perform the method steps for an originating site to select a specific provider from a plurality of providers, for exchanging at least one set of application data with a first called site.

It is noted that this invention may be used for many applications. Thus, although the description is made for particular arrangements and applications, the intent and concept of the invention is suitable and applicable to other arrangements and applications. It will be clear to those skilled in the art that other modifications to the disclosed embodiments can be effected without departing from the spirit and scope of the invention.

Having thus described our invention, what is claimed as new and desired to secure by Letters Patent is as follows:

1. A method for an originating site to select a specific provider from a plurality of providers, for exchanging at least one set of application data with a first called site, the method comprising:

the originating site
   establishing a first control channel between the originating site and the first called site for communicating setup parameters for a first set of application data,
   selecting the specific provider to handle all transmissions of the first set of application data,
   communicating to the first called site via the first control channel a first selection of the specific provider for a first connection used for transmitting the first set of application data;
   making the first connection to the first called site using the specific provider, and routing all forward data of the first set of application data to the first called site on the first connection; and
the first called site
   sending all return data transmissions of the first set of application data to the originating site via the first connection.

2. A method as recited in claim 1, further comprising the originating site using a particular mapping to translate an arbitrary forward destination address for the first connection into a specific destination address for the first connection, wherein the specific destination address belongs to a first address space of the specific provider.

3. A method as recited in claim 2, further comprising:
the originating site
   forwarding the particular mapping to the first called site via the control channel, and
the first called site
   using the particular mapping to form a mapping of a reverse destination address for sending the return application data via the first connection to the originating site, the reverse destination address being in the address space of specific provider.

4. A method as recited in claim 1, further comprising:
the originating site
   establishing a second control channel between the originating site and a second called site for communicating setup parameters for a second set of application data,
   selecting a second provider to handle all transmissions of the second set of application data, and
   communicating to the second called site via the second control channel a second selection of the second provider for a second connection for the second set of application data;
the originating site
   making the second connection to the second called site using the second provider, and
   routing all forward data of the second set of application data to the second called site via the second connection; and
the second called site
   sending all return data of the second set of application data to the originating site via the second connection.

5. A method as recited in claim 4, further comprising the originating site using a second mapping to translate a second arbitrary forward destination address for the second connection, into a second destination address for the second connection, wherein the second destination address belongs to an address space of the second provider.

6. A method as recited in claim 5, further comprising:
the originating site
   forwarding the second mapping to the second called site via the second control channel; and
the second called site
   using the second mapping to form the second mapping of a reverse destination address for sending the return application data via the second connection to the originating site, the reverse destination address being in the address space of the second provider.

7. A method as recited in claim 5, wherein the first called site and the second called site are at a common location.

8. A method as recited in claim 5, wherein the first provider and the second provider are common.

9. A method as recited in claim 5, wherein the first provider and the second provider are a same provider.

10. A method as recited in claim 1, further comprising the first called site confirming to the originating site via the control channel of receiving the first selection.

11. A method as recited in claim 4, further comprising the second called site confirming to the originating site via the second control channel of receiving the second selection.

12. A system enabling an originating site to select a specific provider from a plurality of providers, for exchanging at least one set of application data with a first called site, the system comprising:
   an originating site interface module to establish a first control channel between the originating site and the first called site for communicating setup parameters for a first set of application data,
   a provider selector to select the specific provider to handle all transmissions of the first set of application data, and to communicate via the interface module with the first called site on the first control channel a first selection of the specific provider for a first connection for transmitting the first set of application data;
   an originating site router making the first connection to the first called site using the specific provider, and to route all forward data of the first set of application data to the first called site via the first connection; and
   a first called site router to route all return data transmissions of the first set of application data to the originating site on the first connection.

13. A system as recited in claim 12, further comprising an originating translator to translate an arbitrary forward destination address for the first connection into a specific destination address for the first connection using a particular mapping, wherein the specific destination address belongs to an address space of the specific provider.

14. A system as recited in claim 13, wherein the originating site translator employs the interface module to forward the particular mapping to the first called site via the control channel, and further comprising a first called site translator to use the particular mapping to map a reverse destination address for sending the return application data on the first connection to the originating site, the reverse destination address being in the address space of specific provider.

15. A system as recited in claim 12, wherein the originating site interface module establishes a second control channel between the originating site and a second called site for communicating setup parameters for a second set of application data, and wherein the provider selector selects a second provider to handle all transmissions of the second set of application data, and to communicate to the second called site via the second control channel a selection of the second provider for a second connection for the second set of application data, and further comprising:

the originating site router making the second connection to the second called site using the second provider, and to route all forward data of the second set of application data to the second called site on the second connection; and a second called site router for routing all return data of the second set of application data to the originating site on the second connection.

16. A system as recited in claim 15, wherein the originating site translator is used to translate a second arbitrary forward destination address for the second connection into a second destination address for the second connection, wherein the second destination address belongs to an address space of the second provider.

17. A system as recited in claim 16, wherein the originating site interface module forwards the second mapping to the second called site via the second control channel; and further comprising a second called site translator to map a second mapping of a reverse destination address for sending the return application data on the second connection to the originating site, the reverse destination address being in the address space of second provider.

18. A system as recited in claim 16, wherein the first called site and the second called site are a same site.

19. A system as defined in claim 12, further comprising the first called site interface module to confirm to the originating site via the control channel of receiving the first selection.

20. A system as defined in claim 15, further comprising the second called site interface module to confirm to the originating site via the second control channel of receiving the second selection.

21. An article of manufacture comprising:

a computer usable medium having computer readable program code means embodied therein for causing an originating site to select a specific provider from a plurality of providers, for exchanging at least one set of application data with a first called site, the computer readable program code means in said article of manufacture comprising computer readable program code means for causing a computer to effect:

the originating site
establishing a first control channel between the originating site and the first called site for communicating setup parameters for a first set of application data,
selecting the specific provider to handle all transmissions of the first set of application data, and
communicating to the first called site via the first control channel a first selection of the specific provider for a first connection used for transmitting the first set of application data;

the originating site
making the first connection to the first called site using the specific provider, and
routing all forward data of the first set of application data to the first called site on the first connection; and the first called site
sending all return data transmissions of the first set of application data to the originating site via the first connection.

22. An article of manufacture as recited in claim 21, further comprising computer readable program code means for causing the computer to effect: the originating site using a particular mapping to translate an arbitrary forward destination address for the first connection into a specific destination address for the first connection, wherein the specific destination address belongs to a first address space of the specific provider.

23. An article of manufacture as recited in claim 22, further comprising computer readable program code means for causing the computer to effect:

the originating site
forwarding the particular mapping to the first called site via the control channel, and the first called site
using the particular mapping to form a mapping of a reverse destination address for sending the return application data via the first connection to the originating site, the reverse destination address being in the address space of specific provider.

24. A method as recited in claim 22, further comprising the first called site confirming to the originating site via the control channel of receiving the first selection.

25. A program storage device readable by machine, tangibly embodying a program of instructions executable by the machine to perform method steps for an originating site to select a specific provider from a plurality of providers, for exchanging at least one set of application data with a first called site, said method steps comprising:

the originating site
establishing a first control channel between the originating site and the first called site for communicating setup parameters for a first set of application data,
selecting the specific provider to handle all transmissions of the first set of application data, and
communicating to the first called site via the first control channel a first selection of the specific provider for a first connection used for transmitting the first set of application data;

the first called site
confirming to the originating site via the control channel of receiving the first selection;

the originating site
making the first connection to the first called site using the specific provider, and
routing all forward data of the first set of application data to the first called site on the first connection; and the first called site
sending all return data transmissions of the first set of application data to the originating site via the first connection.

* * * * *